E. SEXTON.
HOT-BED SPRINKLER SYSTEM.
APPLICATION FILED JAN. 17, 1916.
1,220,279.
Patented Mar. 27, 1917.
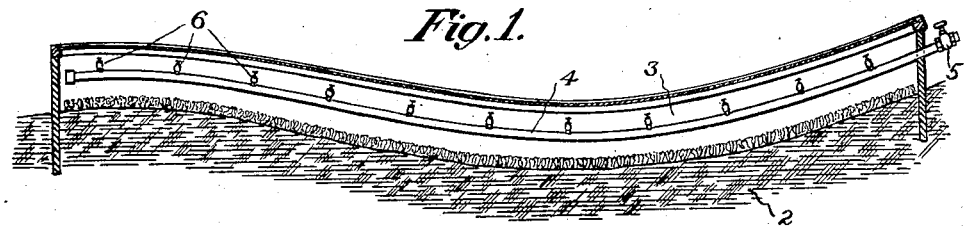
Fig. 1.
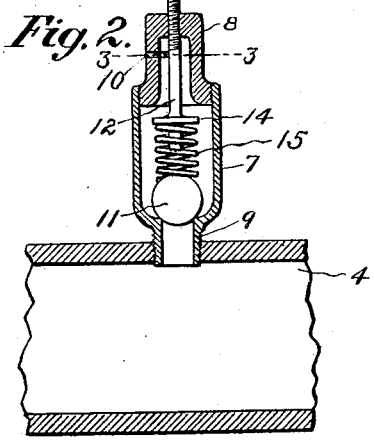
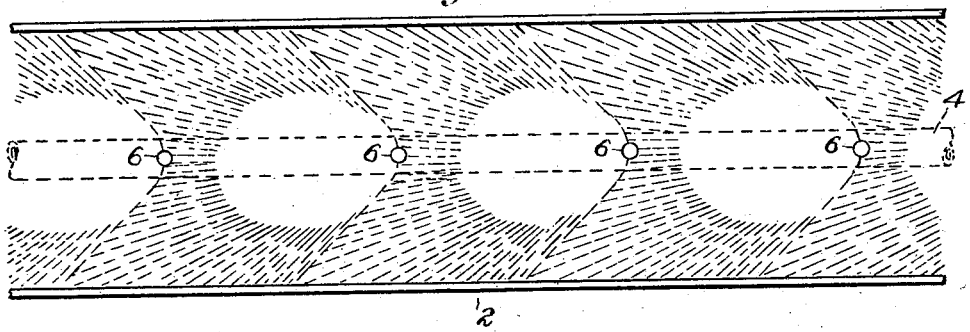
Fig. 4.
Inventor.
Earl Sexton

UNITED STATES PATENT OFFICE.

EARL SEXTON, OF HARTFORD, CONNECTICUT.

HOTBED SPRINKLER SYSTEM.

1,220,279.   Specification of Letters Patent.   Patented Mar. 27, 1917.

Application filed January 17, 1916. Serial No. 72,457.

*To all whom it may concern:*

Be it known that I, EARL SEXTON, a citizen of the United States, residing at Hartford, in the county of Hartford and State of Connecticut, have invented certain new and useful Improvements in Hotbed Sprinkler Systems, of which the following is a specification.

This invention relates to what I shall for convenience term a "hot bed sprinkler system." As a feature of the invention there is a novel form of nozzle as will hereinafter appear. In the raising of tobacco it is the custom to put the plants in a hot bed which is made up of a suitable inclosure and soil in which the plants are bedded. This inclosure generally consists of opposite sides and ends, the top ordinarily comprising sashes. The invention, however, does not concern itself with any particular kind of inclosure, but I have briefly described one which is in more or less common use. Extending lengthwise of this inclosure are one or more pipes or mains which when the organization is used for sprinkling would be intended for the conduct of water. This water, or it might be any other necessary liquid is directed against the plants by nozzles carried by the pipe or pipes at predetermined points thereon. In Letters Patent No. 1,164,128 issued to me December 14, 1915, is shown a hot bed sprinkler system which is eminently satisfactory under ordinary conditions or where the beds are perfectly horizontal. There are times when the bed is not horizontal, at least the soil and inclosure may not stand in this relation, for the inclosure in part may have a dip and a rise or may be actually serpentine or of rolling nature. In this event when the water is shut off, for instance through the action of a valve located outside the inclosure to which I have already alluded, there will be between the valve and the main or pipe in the inclosure, considerable water which will flow down the inclined part or parts of the pipe possibly in one direction and possibly in the opposite direction, and this will pass with considerable force, due to gravity alone into the valley of the soil, thus tending to flood and at times actually uprooting the young plants. I provide means for automatically preventing the discharge of water or other liquid from the nozzle or nozzles in a pipe or main when the pressure of the water in the main passes below a certain point, and this action, as may be gathered in the present case, occurs when the water is cut off for example by the shutting of the valve in question.

In the drawings accompanying and forming part of the present specification I have shown in detail one convenient form of embodiment of the invention which will be fully set forth in the following description. I do not restrict myself to this particular showing; I may depart therefrom in several respects within the scope of the invention defined by the claims following said description.

Referring to said drawings:

Figure 1 is a longitudinal section of a hot bed involving the invention.

Fig. 2 is a vertical section through the pipe or main and nozzle, the section being taken in the direction of the length of the pipe.

Fig. 3 is a horizontal section on the line 3—3 looking downward.

Fig. 4 is a horizontal sectional plan view of the hot bed.

Like characters refer to like parts throughout the several views which are on different scales, Fig. 1 being on a smaller scale than Fig. 4 and Figs. 2 and 3 being on a larger scale than Fig. 4.

In Figs. 1 and 2 the numeral 2 denotes the soil or bed proper and 3 the inclosure of a so-called "hot bed." While this hot bed is primarily intended for the cultivation of tobacco, it can be used in other ways. Similarly while my initial aim is the supply of sprinkling water to the tobacco plants, other liquid in some cases might be used. As will be gathered from what has been noted, the invention does not concern itself with any particular type or construction of hot bed except that one of the fundamental purposes is the provision of means intended for use in connection with a hot bed of irregular form longitudinally. Extending longitudinally of the hot bed is the pipe or main 4, supported in some suitable manner and which like the soil 2 and inclosure 3 is of compound curvature in length, this being merely one of several shapes. The pipe 4 is provided with suitable means for shutting off the supply of water or other liquid thereto, the valve 5 being shown for the purpose. While any desirable number of these pipes 4 may be provided, I have shown but one and this is located substantially centrally between the sides of the inclosure 3. It is equipped with nozzles such as those denoted in a general way by 6 and shown in detail in Figs. 2 and 3. As already stated these nozzles are of novel form, each being provided with automatically operative means for controlling the discharge of water therefrom, although in all cases this automatic control means need not form a direct part of the nozzle. It is of advantage, however, in that the nozzle can be constructed and sold as an article of manufacture for attachment to pipe lines now in use. As will also be understood, I do not restrict myself to the exact construction of nozzle shown, although it has desirably met the necessary conditions. Said nozzle comprises a shell 7 and a cap piece 8, the shell 7 having a reduced nipple 9 adapted to be threaded into a perforation or hole in the upper side of the pipe 4. The cap piece 8 is threaded into the top of the shell or body 7 and has a transverse slot 10 through which the water issues in a stream or jet as will more particularly appear. In the shell is a valve 11 shown as being of ball type, the valve when closed seating against the upper end of the nipple 9. Threaded through the upper closed end of the cap piece 8 is a stem 12 having a manipulating portion 13 which may be milled, and provided interiorly of the nozzle with a crosspiece or disk 14. Between the crosspiece or disk 14 and the valve 11 is a push spring 15 bearing against the respective parts. The stem 12 extends into the coiled valve closing spring 15 for a reason that will hereinafter appear. By turning the shank 12 the tension of the spring 15 can be adjusted to conform to the particular head of the water entering the pipe 4. When this head is reached all the valves 11 will be opened by the pressure of the water, so that the water in the several nozzles 6 and issue can rise in the discharge slots 10 for delivery from onto the plants as will hereinafter more particularly appear. When the pressure of the water passes below this point such for instance as by shutting the valve 5, the springs 15 will immediately close the valves 11, so that the water in the pipe 4 will be effectually prevented from passing from the slots 10 and onto the valleyed or depressed portion or portions of the bed.

There may be cases where it is desired to stop the supply of water or to arrest the normal sprinkling action at or over certain areas, and in this case the necessary shanks 12 will be run in until their lower or extended portions engage the valves 11 so as to hold said valves solidly against their seats and thus prevent positively the passage of water into the nozzles, the valves of which are thus closed.

As already set forth the head or cap portion 8 of each nozzle has a transverse slot 10. It will be noted that the end walls of the slot or discharge opening are rounded or upon arcs, the arcs forming practically segments of an ellipse. Owing to this construction of the slot I find in practice that the water leaves the slot initially in a sheet practically in the form of an ellipse and that the end walls of said slot present virtually the segments of this ellipse. The end walls of the slot owing to their shape, therefore, do not break up the water into separate streams but insure the emergence of the water or other liquid from the nozzle in an approximately segmental sheet or film. The liquid beyond the elliptical sheet is projected in all directions in the form of a sprinkle extending in fact as far as the sides of the inclosure 3. By so positioning the nozzles on the main supply pipe 4 that the bodies of liquid overlap, I can sprinkle adequately and completely the entire predetermined area. I should also note that there is directed from each slot 10 a column of water which extends practically radially from the nozzle in which said slot is formed. This column issues from the slot about centrally thereof and is of greater force than the water which is discharged from the ends of the slot. The consequence of this is that this central portion of the stream breaks up the sheet or film into spray or sprinkle at the marginal portion of the ellipse and the water is projected outward in the form of a spray by the force or power of the central column. In Fig. 4 I have shown one spacing of the nozzles 6 and have shown diagrammatically the relation of the columns or sprays issuing from the slots of the respective nozzles.

What I claim is:

1. The combination of a hot bed, a pipe extending longitudinally of the hot bed and provided with nozzles at predetermined points therealong, and means for automatically preventing the issue of liquid from the nozzles when the pressure in the pipe passes below a certain point.

2. The combination of a hot bed, a pipe extending along the hot bed and provided with a plurality of spaced nozzles and also with a valve, and means for automatically preventing the issue of water from the nozzles when the valve is operated to shut off the supply of liquid to the pipe.

3. The combination of a hot bed comprising an inclosure, and a pipe extending into the inclosure and longitudinally thereof, said pipe being provided with a series of nozzles at different points in the length thereof within the inclosure and provided with a valve outside the inclosure, and means for automatically preventing the issue of liquid from the nozzles when the valve is operated to shut off the supply of water to the pipe.

4. A hot bed sprinkler system comprising a nozzle provided with an outlet and also provided with a valve between the inlet and the outlet, spring means tending constantly to close the valve, and means for non-yieldingly closing the valve against its seat.

5. A hot bed sprinkler system comprising a nozzle having an outlet, a valve at the inlet of the nozzle, a stem extending into the nozzle and provided with a crosspiece, a spring bearing against the valve and the crosspiece, said stem having an extension within the spring and the stem being movable to carry the extension against the valve to hold the same non-yieldingly against its seat.

6. A hot bed sprinkler system comprising a nozzle comprising a shell and a head fitted into the shell, the head having an outlet and the shell a nipple, a valve to seat against the nipple portion of the shell, a stem threaded through the head and provided with a crosspiece, a coiled spring engaging the valve and the crosspiece, the stem having an extension into the spring, the stem being movable into said head to cause the extension to engage the valve to hold the same non-yieldingly against its seat.

7. The combination of a pipe, nozzles carried by said pipe at predetermined points therealong, for the discharge of liquid from the pipe, and means for automatically preventing the issue of liquid from the nozzles when the pressure in the pipe approximately reaches a predetermined point.

8. The combination of a hot bed having an irregular surface, a pipe connected with a source of liquid supply and extending above said surface in a line following approximately the form of said surface, a plurality of nozzles carried by said pipe at intervals throughout its length, and means for automatically insuring an equal and simultaneous discharge from the several nozzles.

9. The combination of a hot bed having a curved surface, a pipe connected with a source of liquid supply and extending above said surface in a line following the curvature thereof, a plurality of nozzles carried by said pipe at intervals throughout its length, and means for automatically insuring an equal and simultaneous discharge from the several nozzles.

10. The combination of a hot bed, a pipe connected with a source of liquid supply and extending above the surface of the hot bed, a plurality of nozzles carried by said pipe at intervals throughout its length, for sprinkling the liquid onto said surface, means for cutting off the supply of liquid to said pipe, and means for automatically preventing the discharge of liquid from the several nozzles approximately at the point that said supply is cut off.

In testimony whereof I affix my signature in presence of two witnesses.

EARL SEXTON.

Witnesses:
L. L. MARKEL,
HEATH SUTHERLAND.

Copies of this patent may be obtained for five cents each, by addressing the "Commissioner of Patents, Washington, D. C."